US012476403B2

(12) United States Patent
Quade et al.

(10) Patent No.: US 12,476,403 B2
(45) Date of Patent: Nov. 18, 2025

(54) CONNECTING APPARATUS

(71) Applicant: ILLINOIS TOOL WORKS INC., Glenview, IL (US)

(72) Inventors: Peter Quade, Walsrode (DE); Maximilian Gunther, Hannover (DE)

(73) Assignee: ILLINOIS TOOL WORKS INC., Glenview, IL (US)

( * ) Notice: Subject to any disclaimer, the term of this patent is extended or adjusted under 35 U.S.C. 154(b) by 785 days.

(21) Appl. No.: 17/836,275

(22) Filed: Jun. 9, 2022

(65) Prior Publication Data

US 2022/0399665 A1 Dec. 15, 2022

(30) Foreign Application Priority Data

Jun. 11, 2021 (DE) ..................... 10 2021 115 124.4
May 30, 2022 (DE) ..................... 10 2022 113 613.2

(51) Int. Cl.
*H01R 13/00* (2006.01)
*H01R 13/502* (2006.01)

(52) U.S. Cl.
CPC ......... *H01R 13/005* (2013.01); *H01R 13/502* (2013.01)

(58) Field of Classification Search
CPC .. H01R 13/005; H01R 13/502; H01R 13/639; H01R 43/26; F01P 2005/125; F01P 5/10; F01P 11/029
See application file for complete search history.

(56) References Cited

U.S. PATENT DOCUMENTS

| | | | | |
|---|---|---|---|---|
| 9,362,643 | B2 | 6/2016 | Schloegl | |
| 10,938,137 | B2 * | 3/2021 | Eriksson | F16L 37/56 |
| 2016/0258340 | A1 * | 9/2016 | Klippert | F01P 7/14 |
| 2018/0360260 | A1 * | 12/2018 | Rotta | F16K 31/12 |
| 2019/0237886 | A1 * | 8/2019 | Eriksson | F16L 37/56 |
| 2021/0021077 | A1 * | 1/2021 | Mathews | H01R 13/5202 |
| 2022/0399665 | A1 * | 12/2022 | Quade | F01P 11/029 |

FOREIGN PATENT DOCUMENTS

| | | | | |
|---|---|---|---|---|
| CN | 109313130 A | * | 2/2019 | G01N 21/43 |

* cited by examiner

*Primary Examiner* — Peter G Leigh
*Assistant Examiner* — Nader J Alhawamdeh
(74) *Attorney, Agent, or Firm* — THOMPSON HINE LLP

(57) ABSTRACT

A connecting apparatus (interface) for connecting a component to a further component includes at least one electrical connecting device for producing an electrical connection and at least one hydraulic connecting device for producing a hydraulic connection. The connecting apparatus is configured in such a way that an electrical connection and a hydraulic connection of the connecting apparatus to a component can be produced simultaneously.

10 Claims, 2 Drawing Sheets

CONNECTING APPARATUS

TECHNICAL FIELD

The present invention relates to a connecting apparatus for connecting a component to a further component.

BACKGROUND

For the connection of components with a hydraulic and an electrical interface, respectively, two different ports are used.

The hydraulic connection is usually designed as a plug-in connection and is used for mechanical connection or fastening a first component to a second component.

In the case of the electrical connection, however, a cable having a male-female connection is usually provided, which must be connected to one another in a second work step in order to produce the electrical connection.

SUMMARY

The problem of the present invention is to provide a connecting apparatus that offers an alternative to the connecting methods that are known from the prior art.

A further problem of the present invention is to provide a connecting apparatus with which a first component is connectable to a second component in a way that is electrically and hydraulically safe and reliable.

In addition, it is a problem of the present invention to provide a simply constructed connecting apparatus.

One or more of these problems are solved by the features of independent claims 1, 7, 8, and 9. Advantageous configurations are specified in the respective dependent subclaims.

According to the invention, a connecting apparatus, which is preferably configured as an interface, is provided for connecting a component to a further component. This comprises at least one electrical connecting device for producing an electrical connection and at least one hydraulic connecting device for producing a hydraulic connection. The present invention is characterized in that the connecting apparatus is configured in such a way that an electrical connection and a hydraulic connection of the connecting apparatus to a component can be produced substantially simultaneously.

The term "substantially simultaneously" in the context of the present invention means that the electrical connection and the hydraulic connection of the connecting apparatus are formed in one pass, in particular by means of a plugging operation. This means that during the merging of the one component with the other component in an assembly direction or a connection direction, and in particular in a plugging direction, the connections can also be produced in a time-delayed manner due to their configuration and/or arrangement; however, according to the invention, only a single connection operation or a single work step is necessary for this purpose.

According to the present invention, it can thus be provided that the electrical and hydraulic connections are formed simultaneously or in succession, so that either the hydraulic connection and then the electrical connection are formed first, or vice versa. However, both connections are formed or produced in a single work step.

The merging in a corresponding plugging or assembly direction is carried out in a linear movement, optionally with a rotational movement with provision of a threaded or bayonet-like connection.

The assembly direction is understood to mean a direction in which a component and the connecting apparatus are moved together in order to produce the electrical connection and the hydraulic connection, wherein this direction runs approximately in an axial direction of the connecting apparatus or approximately parallel to a through-opening of the hydraulic connecting device.

In motor vehicle coolant systems, one or more pumps must be fastened to a coolant container. In addition to a mechanical fastening, an electrical and a hydraulic connection must also be produced. Two or three work steps are usually required in order to form these connections.

With the present invention, there is provided a connecting apparatus for connecting a component to a further component, in which an electrical and a hydraulic connection are produced in a single work step upon connection of the first component, for example a pump for cooling liquid, to a second component, for example a cooling liquid container.

This saves time and costs. Nevertheless, a safe and reliable electrical and hydraulic connection of the first component to the second component is produced.

Furthermore, the connecting apparatus can comprise at least one mechanical connecting device in order to secure the connecting apparatus to a component, wherein the mechanical connecting device can be configured as a positive-locking and/or a non-positive-locking (friction-locking) connection.

The mechanical connection can be produced as a simple plug-in connection by means of an interference fit.

Additionally and/or alternatively, a non-positive-locking connection [is provided] in the form of a thread, for example, in such a way that a quarter or half turn is necessary in order to form the mechanical connection. The mechanical connection can also be provided by means of catching elements, wherein, through a simple plugging, corresponding catching edges of the catching means of the first and the second component engage one another, such that this connection is also designed to be pluggable.

In this way, a mechanical connection of a first component to a second component can be formed safely and reliably.

The electrical connecting device can be configured as a plug-in connection or as a contact connection.

Here, it is provided that the connecting apparatus comprises an electrical connecting device, which preferably produces a safe and reliable electrical connection upon the mechanical connection of the connecting apparatus to a component without a further work step.

For example, the plug-in connection can be configured such that the connecting apparatus comprises a plug or socket and, accordingly, a correspondingly configured socket or plug is provided on the component.

In the case of a contact connection, it is merely provided that the electrical connecting device comprises a first electrical contact surface and a component comprises a corresponding second electrical contact surface, so that an electrical connection is preferably formed when the connecting apparatus is mechanically connected to a component.

The hydraulic connection can be configured as a plug-in connection.

In doing so, when the connecting apparatus is connected to a component, a water-tight or even gas-tight hydraulic connection of the connecting apparatus to the component is produced.

The connecting apparatus can be configured as a separate or independent component.

Accordingly, the connecting apparatus then comprises a first mechanical connecting device for connecting the connecting apparatus to a first component. As soon as the first component is connected to the connecting apparatus, the component can be connected to a second component via the connecting apparatus.

In this way, it is possible to use components without altering their structural design and to provide them with a connecting apparatus according to the invention in order to enable faster assembly and to achieve the advantages described above.

However, it is preferably provided that the connecting apparatus is an integral part of a component. In this way, the work step of connecting the connecting apparatus to the component is eliminated, and a component can be directly connected mechanically, electrically, and hydraulically to a further component via the connecting apparatus.

Furthermore, the connecting apparatus can comprise at least one positioning means in order to align the connecting devices of the connecting apparatus with respect to the corresponding mechanical, electrical, and hydraulic counter-connecting device of a component.

For example, a corresponding nose or web or recess or groove or an equivalently acting positioning means can be provided as the positioning means, which then cooperates with a correspondingly configured counter-positioning means of a component upon connection of the connecting apparatus to a component, such that the electrical connecting device of the connecting apparatus can in particular be safely and reliably connected to an electrical counter-connecting device of the component and also the hydraulic connecting device to a corresponding counter-connecting device of the component.

According to a further aspect of the present invention, as stated above, a component is provided having a connecting apparatus described above, wherein the component can be, for example, a pump or a cooling liquid container of a cooling system of a motor vehicle.

In principle, however, the connecting apparatus according to the invention is not limited to coolant containers and pumps of motor vehicles, but rather is transferable to almost all applications in which an electrical and hydraulic connection are to be produced.

The connecting apparatus according to the invention is thus suitable for any connections in which one or more hydraulic and one or more electrical connections are to be formed.

Accordingly, the connecting apparatus can also comprise at least one or two or more electrical and hydraulic connecting devices.

According to a further aspect of the present invention, a system is provided for producing an electrical and a hydraulic connection of a component to a further component. This system comprises a first component, a second component, and a connecting apparatus described above, wherein the first component and the second component can be connected to one another by means of the connecting apparatus in such a way that, during a connection operation, an electrical connection and a hydraulic connection of the first component to the second component can be produced simultaneously.

The advantages described above by means of the connecting apparatus apply analogously to the system according to the invention.

It is also preferably provided in this system that the connecting apparatus is an integral part of the first or the second component. Alternatively, the connecting apparatus can also be configured as a separate component.

By means of the connecting apparatus, a mechanical connection of the first component to the second component can also be produced.

According to a further aspect of the present invention, there is provided a method of connecting a first component to a second component with the system described above, wherein an electrical and a hydraulic connection of the first component to the second component are produced substantially simultaneously by means of the connecting apparatus.

The first component and the second component can be connected to one another by a linear movement and/or a rotational movement by means of a mechanical connecting device of the connecting apparatus in order to produce the electrical and hydraulic connection of the first component to the second component.

A connection of the connecting apparatus to a component can be produced through a positive-locking and/or a non-positive-locking connection by means of the connecting apparatus.

Accordingly, the connecting apparatus can be produced with a component, for example via a screw connection and/or a plug connection and/or a latch connection and/or an integral connection, preferably manufactured in a 2-component injection molding process.

If the connecting apparatus is embodied as a separate component, it accordingly comprises a first electrical connecting device and a second electrical connecting device as well as a first hydraulic connecting device and a second hydraulic connecting device and preferably a first mechanical connecting device and a second mechanical connecting device, such that the connecting apparatus serves as an interface between two components and is electrically, hydraulically, and preferably mechanically connectable to both components in order to connect the two components to one another accordingly.

BRIEF DESCRIPTION OF THE DRAWINGS

The present invention will be described below on the basis of an embodiment shown in the figures. The figures show.

DETAILED DESCRIPTION

Figure 1:
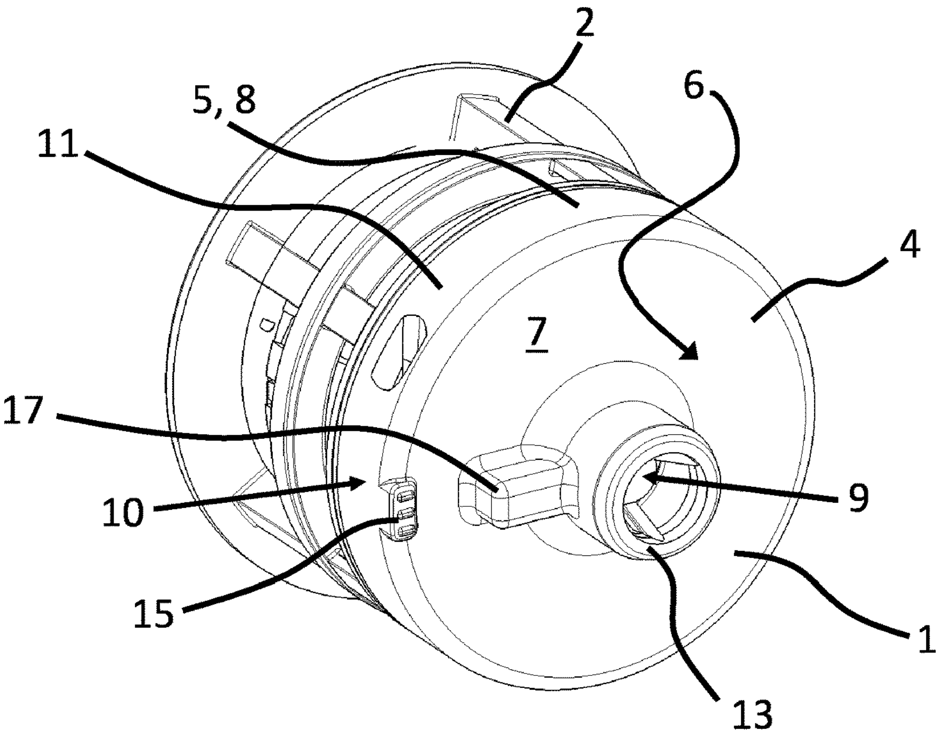
FIG. 1 a schematic perspective view of a first component, for example a cooling liquid pump, with a connecting apparatus according to the invention, FIG. 2 a schematic perspective view of a second component, for example a cooling liquid container with two ports for receiving the connecting apparatus according to the invention and the first component, and FIG. 3 a further schematic perspective view of a further exemplary embodiment of the connecting apparatus.
Figure 2:
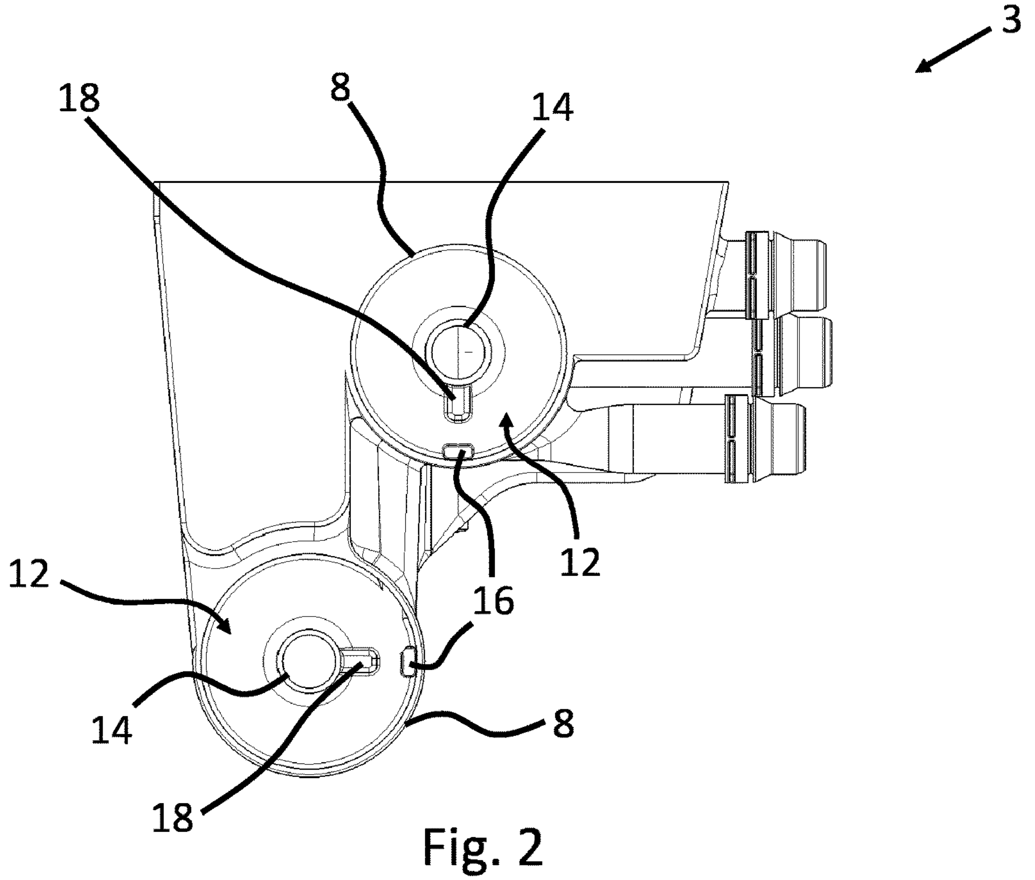
Figure 3:
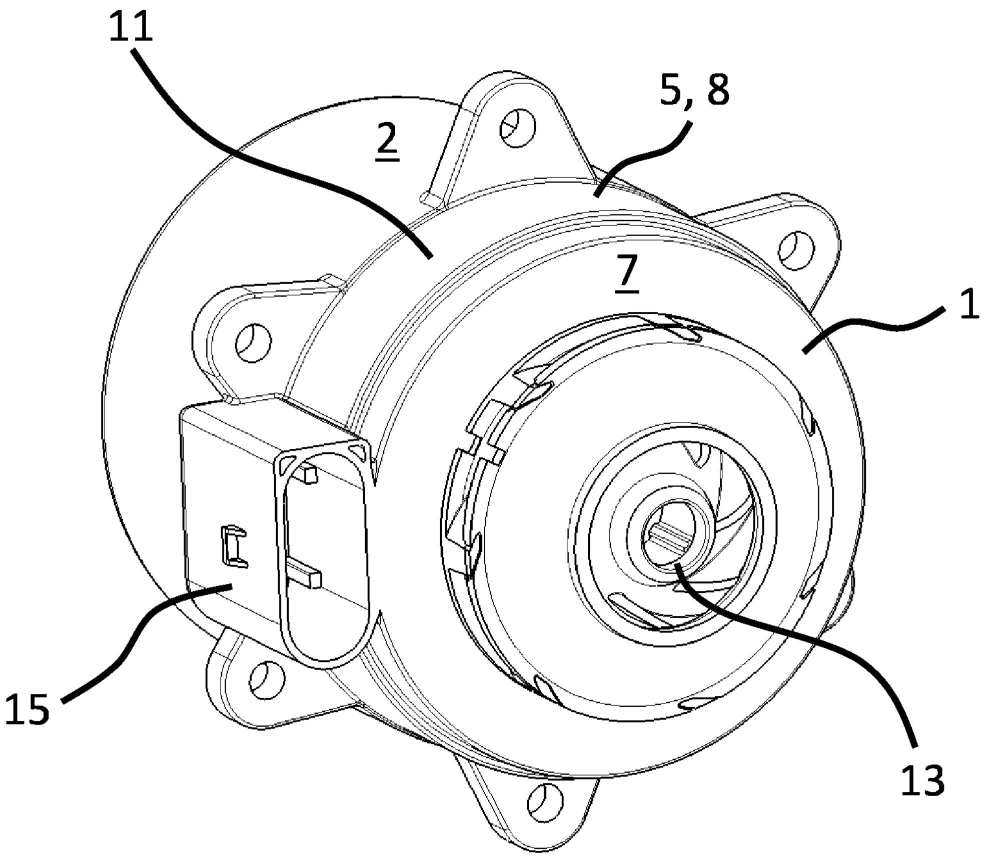

In the following, a connecting apparatus 1 according to the invention for connecting a first component to a second component (FIGS. 1 to 3) is described in more detail.

In the present exemplary embodiment, the first component is, for example, a cooling liquid pump 2 and the second component is, for example, a cooling water container 3.

However, the connecting apparatus 1 according to the invention is suitable for any connections in which one or more hydraulic and one or more electrical connections are to be formed.

According to this exemplary embodiment, the connecting apparatus 1 is approximately bowl-shaped and has a base wall 4 and a radially circumferential side wall 5.

In the region of the side wall 5, the base wall 4 forms a first connecting wall 6 for connecting to the cooling liquid pump 2.

The opposite side of the base wall 4 forms a second connecting wall 7 for connecting to the cooling liquid container 3.

The sidewall 5 forms a first mechanical connecting device 8, via which the connecting apparatus 1 can be connected to a radially circumferential casing wall (mechanical counter-connecting device) of the cooling liquid pump 2 in the manner of plug-in connection in a positive-locking manner and/or non-positive-locking manner.

Furthermore, a first hydraulic connecting device 9 (not shown/obstructed) is provided on the second connecting wall 7 in the form of a sealingly designed through-opening, for example in the manner of a socket (or plug), via which device a hydraulic connection of the connecting apparatus 1 to the cooling liquid pump 2 can be produced.

In addition, a first electrical connecting device 10 (not shown/hidden) is provided on the second connecting wall 7 in a transition region between the base wall 4 and the side wall 5. In the present exemplary embodiment, the first electrical connecting device 10 is configured as a socket (or plug) via which an electrical connection of the connecting apparatus 1 to the cooling liquid pump 2 can be produced.

An outer casing wall of the side wall 5 forms a second mechanical connecting device 11 for connecting the connecting apparatus 1 in the manner of a plug-in connection to a corresponding connecting recess 12 (mechanical counter-connecting device) of the cooling liquid container 3.

A sealingly designed nozzle is also provided on the second connecting wall 7, which forms a second hydraulic connecting device 13. In this way, the connecting apparatus 1 is hydraulically connectable to a corresponding hydraulic port 14 (hydraulic counter-connecting device) of the cooling liquid container 3.

A second electrical connecting device 15 is provided on an edge region of the base wall 4 of the second connecting wall 7 in the region of the side wall 5, via which device the connecting apparatus 1 can be electrically connected to a correspondingly configured electrical port 16 (electrical counter-connecting device) of the cooling liquid container 3. Accordingly, the electrical port 16 is configured as a socket.

In the region of the second hydraulic connecting device 13, a positioning means 17 is integrally formed on the second connecting wall 7. The positioning means 17 is designed as a web extending in the radial direction. However, the positioning means 17 can have any suitable structural design.

In the connecting recess 12, the cooling liquid container 3 comprises a counter-positioning means 18 configured so as to correspond to the positioning means 17. Accordingly, the counter-positioning means 18 is configured as a groove extending from the hydraulic port 14 in a radially outward direction.

According to a further exemplary embodiment (not shown), it is provided that the connecting apparatus 1 is an integral part of a component, for example of the cooling liquid pump 2 or the cooling liquid container 3.

Furthermore, according to the present invention, a system is provided in which a first component, for example a cooling liquid pump 2, can be connected to a second component, for example a cooling liquid container 3, via the connecting apparatus 1.

According to a further exemplary embodiment of the connecting apparatus 1, an impeller of the cooling liquid pump 2 can be exposed and form the second hydraulic connecting device 13, wherein the hydraulic port of the cooling liquid container must accordingly be configured so as to be sealingly receptive.

According to a method according to the invention, a cooling liquid pump 2 comprising a connecting apparatus 1 according to the invention is introduced through its second connecting wall 7 into a connecting recess 12 of a cooling liquid container 3.

Upon insertion of the connecting apparatus 1 into the connecting recess 12, an electrical, hydraulic, and mechanical connection are simultaneously made between the connecting apparatus 1 and the cooling liquid pump 2 and cooling liquid container 3, respectively.

According to the method according to the invention, it is thus generally provided that an electrical and a hydraulic connection of a first component to a second component is produced substantially simultaneously for connecting a first component to the system described above by means of the connecting apparatus.

The first component and the second component can be connected to one another by a linear movement and/or a rotational movement by means of a mechanical connecting device of the connecting apparatus in order to produce the electrical and hydraulic connection of the first component to the second component.

A connection of the connecting apparatus to a component can be produced through a positive-locking and/or a non-positive-locking connection by means of the connecting apparatus.

Accordingly, the connecting apparatus can be produced with a component, for example via a screw connection and/or a plug connection and/or a latch connection and/or an integral connection, preferably manufactured in a 2-component injection molding process.

If the connecting apparatus is embodied as a separate component, it accordingly comprises a first electrical connecting device and a second electrical connecting device as well as a first hydraulic connecting device and a second hydraulic connecting device and preferably a first mechanical connecting device and a second mechanical connecting device, such that the connecting apparatus is configured as an interface between two components and is electrically, hydraulically, and preferably mechanically connectable to both components in order to connect the two components to one another accordingly.

LIST OF REFERENCE NUMERALS

1 Connecting apparatus
2 Cooling liquid pump
3 Cooling liquid container
4 Base wall
5 Side wall
6 First connecting wall
7 Second connecting wall
8 First mechanical connecting device
9 First hydraulic connecting device
10 First electrical connecting device
11 Second mechanical connecting device
12 Connecting recess
13 Second hydraulic connecting device
14 Hydraulic port
15 Second electrical connecting device
16 Electrical port
17 Positioning means
18 Counter-positioning means

The invention claimed is:

1. A system for connecting components, comprising a first component, a second component, a connecting apparatus comprising:

at least one electrical connecting device for producing an electrical connection, and at least one hydraulic connection means for producing a hydraulic connection, wherein the connecting apparatus is configured such that an electrical connection and a hydraulic connection can be produced substantially simultaneously;

wherein the first component and the second component are connectable to one another via the connecting apparatus such that, during a connection operation, the electrical connection and the hydraulic connection of the first component to the second component can be produced substantially simultaneously, and wherein the connecting apparatus is configured as a separate component or as an integral part of the first component and/or the second component.

2. The system according to claim 1, wherein at least one mechanical connecting device is provided in order to secure the first component to the second component, wherein the mechanical connecting device is configured as a positive-locking and/or a non-positive-locking connection.

3. The system according to claim 1, wherein the electrical connecting device is configured as a plug-in connection or as a contact connection.

4. The system according to claim 1, wherein the hydraulic connection is configured as a plug-in connection.

5. The system according to claim 1, wherein at least one positioning means is provided in order to align the connecting devices of the connecting apparatus with respect to a corresponding counter-connecting device of at least one of the first component and/or the second component.

6. The system according to claim 1, wherein the connecting apparatus is an integral part of the first component and/or the second component.

7. A method for connecting the first component to the second component with the system according to claim 1, wherein the electrical connection and the hydraulic connection of the first component to the second component is produced substantially simultaneously by the connecting apparatus in a single pass.

8. The method according to claim 7, wherein the first component and the second component are connected to one another by a linear movement and/or a rotational movement by means of a mechanical connecting device of the connecting apparatus.

9. The system according to claim 1, wherein the first component is a cooling liquid pump and the second component is a cooling liquid container.

10. The system of claim 1, wherein the at least one hydraulic connection means is located centrally on the first component and/or the second component, and the at least one electrical connecting device is located along a peripheral portion of the first component and/or the second component.

* * * * *